(12) United States Patent
Slobodyanyuk et al.

(10) Patent No.: US 11,796,654 B2
(45) Date of Patent: Oct. 24, 2023

(54) DISTRIBUTED SENSOR CALIBRATION AND SENSOR SHARING USING CELLULAR VEHICLE-TO-EVERYTHING (CV2X) COMMUNICATION

(71) Applicant: QUALCOMM Incorporated, San Diego, CA (US)

(72) Inventors: Volodimir Slobodyanyuk, San Diego, CA (US); Mohammed Ataur Rahman Shuman, San Diego, CA (US); Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 765 days.

(21) Appl. No.: 16/560,205

(22) Filed: Sep. 4, 2019

(65) Prior Publication Data

US 2021/0063546 A1    Mar. 4, 2021

(51) Int. Cl.
*G01S 7/497* (2006.01)
*H04W 4/40* (2018.01)
*G01S 7/40* (2006.01)
*G01C 25/00* (2006.01)

(52) U.S. Cl.
CPC ............ *G01S 7/497* (2013.01); *G01C 25/005* (2013.01); *G01S 7/40* (2013.01); *H04W 4/40* (2018.02)

(58) Field of Classification Search
CPC . G01S 7/497; G01S 7/40; H04W 4/40; G01C 25/005
See application file for complete search history.

(56) References Cited

U.S. PATENT DOCUMENTS

| 8,954,226 | B1* | 2/2015 | Binion | G07C 5/008 |
| | | | | 701/33.4 |
| 2013/0158821 | A1* | 6/2013 | Ricci | B60W 40/08 |
| | | | | 705/14.62 |
| 2015/0112800 | A1* | 4/2015 | Binion | G06Q 30/0255 |
| | | | | 705/14.53 |
| 2018/0156624 | A1* | 6/2018 | Bai | G01C 21/3484 |
| 2018/0307238 | A1* | 10/2018 | Wisniowski | G05D 1/0246 |

* cited by examiner

*Primary Examiner* — Peter M Bythrow
*Assistant Examiner* — Nazra Nur Waheed
(74) *Attorney, Agent, or Firm* — QUALCOMM Incorporated

(57) ABSTRACT

Various aspects of the present disclosure generally relate to vehicle sensors. In some aspects, a device associated with a vehicle may obtain, from an external source, calibration data including a first set of measurements related to a position of one or more objects in a reference frame associated with the external source. The device may identify a second set of measurements related to the position of the one or more objects within a field of view of one or more onboard sensors, and update a calibration table based at least in part on a comparison of one or more of the first set of measurements and one or more of the second set of measurements that are most time-aligned. Accordingly, the device may convert sensor-derived location information from a source reference frame to a reference frame associated with the vehicle using the updated calibration table. Numerous other aspects are provided.

30 Claims, 6 Drawing Sheets

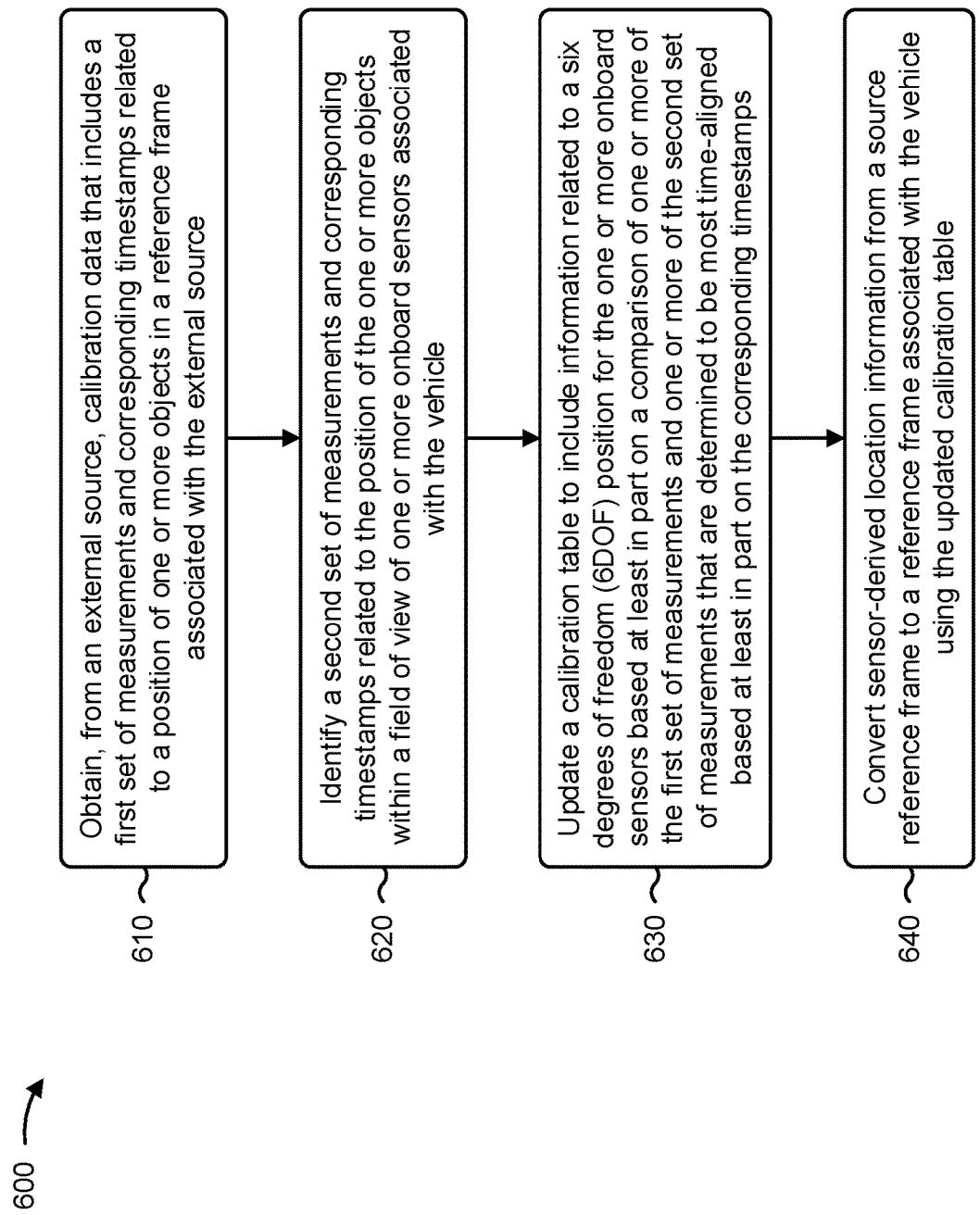

DISTRIBUTED SENSOR CALIBRATION AND SENSOR SHARING USING CELLULAR VEHICLE-TO-EVERYTHING (CV2X) COMMUNICATION

FIELD OF THE DISCLOSURE

Aspects of the present disclosure generally relate to vehicle sensors and to distributed sensor calibration and sensor sharing using cellular vehicle-to-everything (CV2X) communication.

BACKGROUND

A vehicle may include a sensor system that includes one or more sensors to determine characteristics associated with the vehicle and/or characteristics associated with an environment of the vehicle. For example, such a sensor system may be configured to detect proximity to an object, a weather condition, a road condition, a vehicle speed, a traffic condition, a location of the vehicle, and/or the like.

SUMMARY

In some aspects, a method, performed by a device, may include: obtaining, from an external source, calibration data that includes a first set of measurements and corresponding timestamps related to a position of one or more objects in a reference frame associated with the external source; identifying a second set of measurements and corresponding timestamps related to the position of the one or more objects within a field of view of one or more onboard sensors associated with a vehicle; updating a calibration table to include information related to a six degrees of freedom (6DOF) position for the one or more onboard sensors based at least in part on a comparison of one or more of the first set of measurements and one or more of the second set of measurements that are determined to be most time-aligned based at least in part on the corresponding timestamps; and converting sensor-derived location information from a source reference frame to a reference frame associated with the vehicle using the updated calibration table.

In some aspects, a device may include a memory and one or more processors operatively coupled to the memory. The memory and the one or more processors may be configured to: obtain, from an external source, calibration data that includes a first set of measurements and corresponding timestamps related to a position of one or more objects in a reference frame associated with the external source; identify a second set of measurements and corresponding timestamps related to the position of the one or more objects within a field of view of one or more onboard sensors associated with a vehicle; update a calibration table to include information related to a 6DOF position for the one or more onboard sensors based at least in part on a comparison of one or more of the first set of measurements and one or more of the second set of measurements that are determined to be most time-aligned based at least in part on the corresponding timestamps; and convert sensor-derived location information from a source reference frame to a reference frame associated with the vehicle using the updated calibration table.

In some aspects, a non-transitory computer-readable medium may store one or more instructions. The one or more instructions, when executed by one or more processors of a device, may cause the one or more processors to: obtain, from an external source, calibration data that includes a first set of measurements and corresponding timestamps related to a position of one or more objects in a reference frame associated with the external source; identify a second set of measurements and corresponding timestamps related to the position of the one or more objects within a field of view of one or more onboard sensors associated with a vehicle; update a calibration table to include information related to a 6DOF position for the one or more onboard sensors based at least in part on a comparison of one or more of the first set of measurements and one or more of the second set of measurements that are determined to be most time-aligned based at least in part on the corresponding timestamps; and convert sensor-derived location information from a source reference frame to a reference frame associated with the vehicle using the updated calibration table.

In some aspects, an apparatus for wireless communication may include: means for obtaining, from an external source, calibration data that includes a first set of measurements and corresponding timestamps related to a position of one or more objects in a reference frame associated with the external source; means for identifying a second set of measurements and corresponding timestamps related to the position of the one or more objects within a field of view of one or more onboard sensors associated with a vehicle; means for updating a calibration table to include information related to a 6DOF position for the one or more onboard sensors based at least in part on a comparison of one or more of the first set of measurements and one or more of the second set of measurements that are determined to be most time-aligned based at least in part on the corresponding timestamps; and means for converting sensor-derived location information from a source reference frame to a reference frame associated with the vehicle using the updated calibration table.

Aspects generally include a method, apparatus, system, computer program product, non-transitory computer-readable medium, user device, wireless communication device, vehicle, sensor, roadside unit, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effec

FIG. 6 is a flowchart of an example process associated with distributed sensor calibration and sensor sharing using CV2X communication, in accordance with various aspects of the present disclosure.

DETAILED DESCRIPTION

Figure 1:
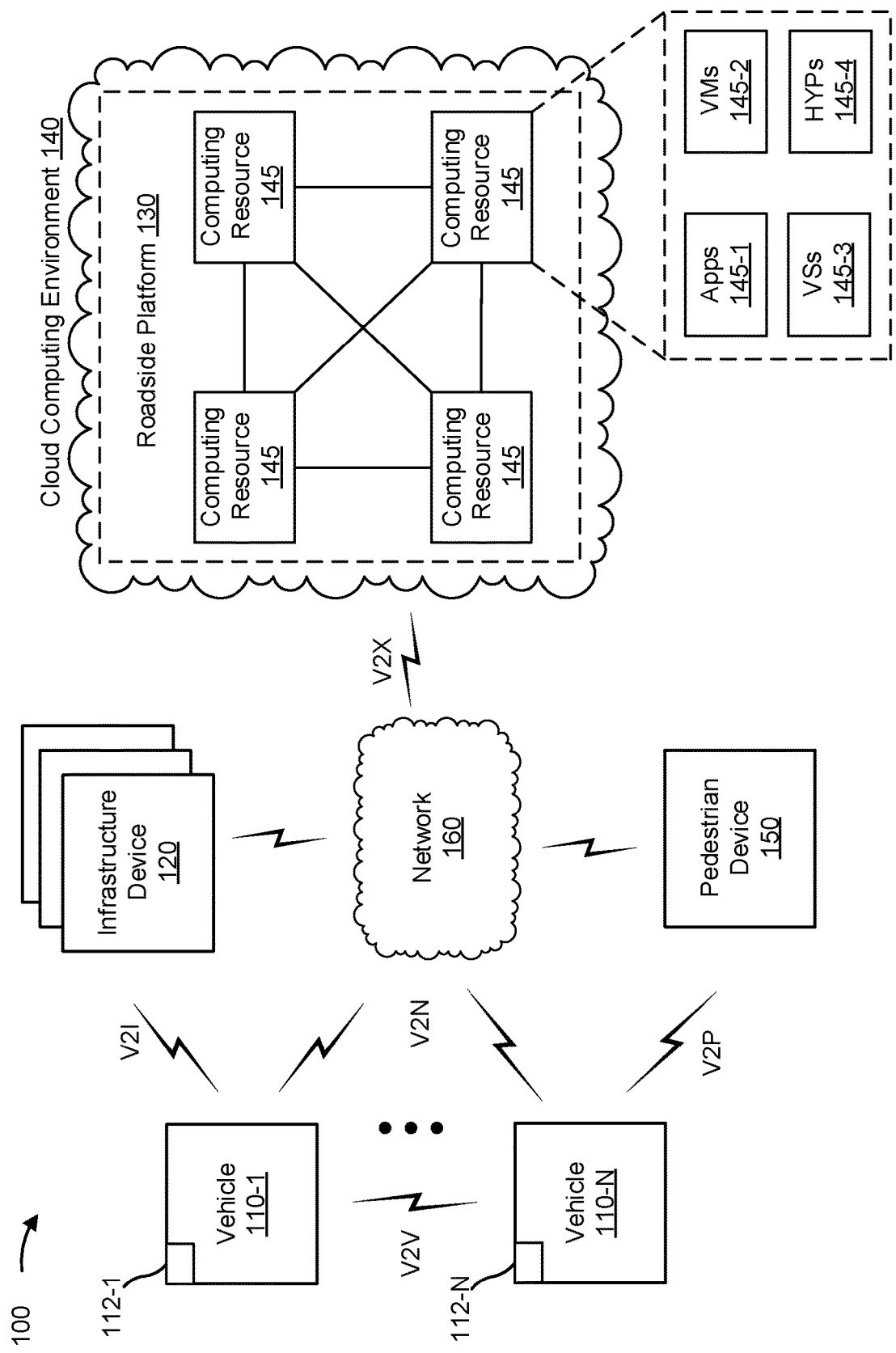
- FIG. 1 is a diagram illustrating an example environment in which distributed sensor calibration and sensor sharing using cellular vehicle-to-everything (CV2X) communication described herein may be implemented, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Many vehicles are equipped with advanced driver assistance systems (ADAS) designed to improve the convenience and safety of driving by warning the driver that a crash is imminent, temporarily automating and/or adapting vehicle control such as acceleration, braking, steering, and/or the like, or otherwise aiding a motorist while driving. For example, ADAS technologies may support forward collision warnings, automatic emergency braking, lane departure warnings, lane keeping assistance, blind spot monitoring, rear cross-traffic alerts, adaptive cruise control, automated lighting, collision avoidance, pedestrian crash avoidance mitigation, and/or the like. Furthermore, vehicles are increasingly equipped with technologies to support autonomous driving, whereby a vehicle moves safely with little or no human input. As ADAS, autonomous driving, and/or similar technologies become more prevalent, roadway crash rates, injuries, fatalities, and/or the like may potentially be reduced by reducing incidents that occur (at least in part) due to human error (e.g., by alerting the driver to potential problems, controlling the vehicle to avoid collisions, and/or the like).

To enable ADAS features, autonomous driving, and/or the like, vehicles are generally equipped with a sensor suite including various sensors that can perceive or otherwise sense characteristics associated with the vehicle (e.g., movement data, location data, and/or the like) and/or characteristics associated with an environment surrounding the vehicle (e.g., signage, obstacles, the presence of vulnerable road users such as pedestrians and/or bicyclists, and/or the like). For example, the sensor suite on a particular vehicle that supports ADAS features, autonomous driving, and/or the like may include one or more cameras, radar sensors, light detection and ranging (LIDAR) sensors, sonar sensors, global navigation satellite system (GNSS) receivers, vehicle odometers, inertial measurement units, and/or the like. However, there are various circumstances in which even high-quality, high-accuracy sensors may be unreliable.

For example, sensor performance may be degraded due to radar interference as a quantity of vehicles attempting to simultaneously use active radar sensors in a given area exceeds a certain density (e.g., in urban environments, areas that frequently have dense traffic and/or congestion, and/or the like), which may cause even the most sophisticated interference mitigation algorithms to fail due to radio frequency (RF) front-end saturation. In another circumstance, RF shadowing (sometimes referred to as fading, attenuation, and/or the like) may occur when objects in a surrounding environment obstruct propagation paths between transmitters and receivers. For example, an object constructed from certain materials (e.g., metal) may create an RF shadow that can potentially obscure other objects, thus limiting the usefulness and/or reliability of available sensor data. In another circumstance, optical shadows in an optical domain may prevent optical sensors (e.g., camera-based sensors, LIDAR sensors, and/or the like) from detecting objects that are positioned behind another object (e.g., a pedestrian walking behind a sign).

Furthermore, in some cases, vehicular sensors may become unreliable due to inaccurate calibration caused by a misaligned sensor, calibration drift, and/or the like (e.g., after a vehicle is repaired, an impact causes a sensor to shift positions, and/or the like). In this case, inaccurate calibration may interfere with an ability to accurately convert location information from a reference frame associated with a source sensor to a common reference frame associated with the vehicle (e.g., a vehicle reference frame, a flat Earth reference frame, an Earth-centered Earth-fixed reference frame, and/or the like). Failure to adequately address issues in sensor calibration, alignment, and/or the like may distort the representation of the surrounding environment, which may adversely impact performance of a software stack that relies on an accurate representation of the surrounding environment to enable ADAS features, autonomous driving, and/or the like. Accordingly, when sensor data available to the software stack becomes unreliable (e.g., due to radar interference, an RF shadow, an optical shadow, inaccurate calibration, and/or the like), using such sensor data may result in catastrophic events (e.g., a collision with another vehicle, a pedestrian, a bicyclist, road infrastructure, and/or the like), damage to hardware resources (e.g., damage to one or more vehicles, traffic infrastructure, and/or the like), personal injury, wasted computing resources (e.g., processing resources, memory resources, network resources, and/or the like that are consumed obtaining and processing unreliable sensor data), and/or the like.

Some aspects described herein provide techniques and apparatuses to enable distributed sensor calibration and sensor sharing using cellular vehicle-to-everything (CV2X) communication. For example, vehicle-to-everything (V2X) communication is an umbrella term that generally refers to technologies that can be used to communicate information between a vehicle equipped with suitable communication capabilities and one or more other devices. For example, V2X communication may include vehicle-to-vehicle (V2V) communication technologies that allow vehicles to communicate with one another (e.g., to support safety systems with non-line-of-sight and latency-sensitive collision avoidance capabilities), vehicle-to-infrastructure (V2I) communication technologies that allow vehicles to communicate with external systems such as street lights, buildings, and/or the like, vehicle-to-pedestrian (V2P) communication technologies that allow vehicles to communicate with smartphones, connected wearable devices, and/or the like, vehicle-to-network (V2N) communication technologies that allow vehicles to communicate with network devices (e.g., according to a CV2X protocol that uses Long Term Evolution (LTE), New Radio (NR), and/or the like as an enabling technology), and/or the like. Accordingly, some aspects described herein may enable a vehicle to obtain sensor-assistance data from one or more external sources over one or more CV2X channels in order to integrate sensor data available from the external sources with sensor data available from one or more onboard sensors, calibrate and thereby improve accuracy of the one or more onboard sensors, and/or the like.

In particular, some aspects described herein relate to a distributed sensor sharing service that includes one or more infrastructure sensors and one or more roadside units that are arranged or otherwise configured to provide sensor data to one or more vehicles over a CV2X channel. For example, whereas vehicular sensor suites are typically subject to various limitations with respect to power, form factor, cost, and/or the like, which may potentially impact performance of vehicular sensors, infrastructure sensors may be subject to fewer restrictions (e.g., because power can be supplied from a grid rather than a vehicle battery and/or the like, traffic infrastructure may support infrastructure sensors that have large and/or irregular form factors, higher costs can be spread across a large user population, and/or the like). Accordingly, in some aspects, the infrastructure sensors deployed in the distributed sensor sharing service may be more sophisticated and have more capabilities, and thus yield better quality sensor data than may otherwise be available from onboard vehicle sensors. Furthermore, the infrastructure sensors can be strategically deployed at certain locations that provide a clear vantage point and separation from interference sources (e.g., high above ground on a light pole, building, and/or the like), which may mitigate performance degradation due to issues such as radar interference, RF shadows, optical shadows, and/or the like.

Accordingly, when a vehicle approaches an area where the distributed sensor sharing service is deployed or otherwise available, the vehicle may receive a notification from the one or more roadside units indicating the availability of the distributed sensor sharing service over a CV2X channel. In some aspects, the vehicle may communicate with the one or more roadside units over the CV2X channel to obtain authenticated access to the distributed sensor sharing service (e.g., based at least in part on a subscription, a one-time payment, and/or the like), and the infrastructure sensors may transmit sensor data to the vehicle over a CV2X channel based at least in part on the one or more roadside units authenticating the vehicle. In some aspects, the vehicle may use a calibration table to convert information contained in the sensor data provided by the infrastructure sensors from a reference frame associated with the infrastructure sensors to a common reference frame (e.g., a vehicle reference frame, a flat Earth reference frame, an Earth-centered Earth-fixed reference frame, and/or the like).

Furthermore, some aspects described herein relate to a distributed sensor calibration process (e.g., a cross-calibration process) in which a vehicle may obtain data for calibrating one or more onboard sensors from one or more external sources (e.g., a neighboring vehicle, an infrastructure device, and/or the like) via CV2X communication. For example, in some aspects, the one or more external sources may correspond to one or more neighboring vehicles that communicate with the vehicle having the onboard sensors to be calibrated according to a V2V protocol. For example, in some aspects, the vehicle and the external source(s) may exchange one or more CV2X messages (e.g., a basic safety message (BSM), a traffic information message (TIM), a MAP message to convey geographic road information, a cooperative awareness message (CAM), a distributed environment notification message (DENM), a signal phase and timing (SPaT) message, and/or the like), and the vehicle may request calibration data from the external source(s) based on various conditions.

For example, in some aspects, the calibration data may be requested based on one or more of a confidence level associated with the onboard sensors failing to satisfy a threshold value, sensor capabilities of the external source(s), a location and/or direction of travel associated with the external source(s), and/or the like. In some aspects, the calibration data requested and obtained from the external source(s) may include one or more measurements that relate to a location or position of one or more objects in six degrees of freedom (6DOF), timestamps corresponding to the measurements, sensor input data such as images or video frames depicting the one or more objects, and/or the like. Accordingly, as described in further detail elsewhere herein, the vehicle may perform a comparison between the calibration data received from the external source(s) and sensor data associated with the onboard sensors (e.g., measurements and corresponding timestamps based on a position of the one or more objects in a field of view of the onboard sensors), and use the comparison to update a local calibration table used to convert location information from a source reference frame to a common reference frame associated with the vehicle (e.g., the vehicle reference frame, flat Earth reference frame, and/or the like).

In this way, by obtaining the sensor-assistance data (e.g., infrastructure sensor data, sensor calibration data, and/or the like) from one or more external sources (e.g., infrastructure sensors, neighboring vehicles, and/or the like), a vehicle software stack may be provided with more accurate and reliable sensor data to enable ADAS features, autonomous driving, and/or the like. In this way, performance of the software stack, which relies on an accurate representation of the environment surrounding the vehicle, may be improved in conditions where onboard sensor data is unreliable due to radar interference, RF shadows, optical shadows, inaccurate calibration, and/or the like. In this way, improving quality and/or accuracy of the sensor data used by the software stack may improve road safety (e.g., by alerting the driver and/or controlling the vehicle to avoid a collision), conserve computing resources that may otherwise be consumed obtaining and processing unreliable and/or inaccurate sensor data, and/or the like.

FIG. 1 is a diagram of an example environment 100 in which distributed sensor calibration and sensor sharing using CV2X communication described herein may be implemented. As shown in FIG. 1, environment 100 may include one or more vehicles 110-1 to 110-N (referred to individually as a "vehicle 110" and collectively as "vehicles 110") with corresponding electronic control units (ECUs) 112-1 to 112-N (referred to individually as an "ECU 112" and collectively as "ECUs 112"), one or more infrastructure devices 120 (referred to individually as an "infrastructure device 120" and collectively as "infrastructure devices 120"), a roadside platform 130 hosted in a cloud computing environment 140 that includes one or more computing resources 145 (referred to individually as a "computing resource 145" and collectively as "computing resources 145"), a pedestrian device 150, and a network 160.

Devices of environment 100 may interconnect via wired connections, wireless connections, or a combination of wired and wireless connections. Furthermore, as shown in FIG. 1, devices of environment 100 may communicate according to one or more V2X protocols. For example, in some aspects, vehicles 110 may communicate with each other according to a V2V protocol, with infrastructure device 120 according to a V2I protocol, with pedestrian device 150 according to a V2P protocol, with network 160 according to a V2N protocol, and with roadside platform 130 according to a V2X protocol (e.g., a vehicle-to-cloud (V2C) protocol), and/or the like.

Vehicle 110 may include any vehicle that includes an onboard sensor suite and V2X communication capabilities, as described herein. For example, vehicle 110 may be a consumer vehicle, an industrial vehicle, a commercial vehicle, and/or the like. Vehicle 110 may be capable of traveling and/or providing transportation via public roadways, may be capable of use in operations associated with a worksite (e.g., a construction site), and/or the like. Vehicle 110 may be controlled, at least in part, via ECU 112 and the onboard sensor suite. For example, in some aspects, vehicle 110 may use the onboard sensor suite to support one or more ADAS features (e.g., forward collision warnings, automatic emergency braking, lane departure warnings, lane keeping assistance, blind spot monitoring, and/or the like). Furthermore, in some aspects, vehicle 110 may use the onboard sensor suite to enable autonomous driving features.

In some aspects, as described in further detail elsewhere herein, vehicle 110 may use the V2X communication capabilities to obtain sensor-assistance data from one or more external sources (e.g., another vehicle 110, infrastructure device 120, and/or the like), and the sensor-assistance data may be used to augment, calibrate, or otherwise improve performance associated with the onboard sensor suite. Additionally, or alternatively, in some aspects, vehicle 110 may use the V2X communication capabilities to provide sensor-assistance data (e.g., calibration data, sensor data, and/or the like) to an external device (e.g., another vehicle 110, infrastructure device 120, and/or the like).

ECU 112 includes one or more devices capable of receiving, generating, storing, processing, and/or providing information associated with distributed sensor calibration and/or distributed sensor sharing, as described in further detail elsewhere herein. For example, in some aspects, ECU 112 may include a communication and/or computing device, such as an onboard computer, a control console, an operator station, or a similar type of device. In some aspects, ECU 112 may include and/or be used in a distributed sensor calibration and/or distributed sensor sharing system, as described herein. For example, the ECU 112 may permit the vehicle 110 to obtain sensor-assistance data from one or more external sources, provide sensor-assistance data to an external device, and/or the like. In some aspects, although each vehicle 110 in FIG. 1 is shown to have one corresponding ECU 112, one or more vehicles 110 in environment 100 may include multiple ECUs 112.

Infrastructure device 120 includes one or more devices capable of receiving, generating, storing, processing, and/or providing information associated with distributed sensor calibration and/or distributed sensor sharing, as described in further detail elsewhere herein. For example, in some aspects, infrastructure device 120 may include advanced lane markings that work with automated sensors to detect lines outside a vision-based spectrum to improve lane detection and traffic safety in any road and/or weather condition, smart road signs that are retroreflective to be readable by sensors in any condition, traffic lights that can communicate information related to signal phase and timing, wireless communication devices that can directly connect to vehicle 110, pedestrian device 150, and/or the like to convey information related to a surrounding environment, a state of infrastructure device 120, and/or the like. Furthermore, in some aspects, infrastructure device 120 may correspond to, include, and/or be associated with one or more infrastructure sensors that can be used in a distributed sensor calibration and/or distributed sensor sharing system, as described herein.

Roadside platform 130 includes one or more computing resources assigned to receive, generate, process, and/or provide information associated with distributed sensor calibration and/or distributed sensor sharing, as described herein. For example, roadside platform 130 may include one or more roadside units that are deployed along a roadway and configured to wirelessly communicate with ECUs 112 of vehicles 110, infrastructure device 120, pedestrian device 150, and/or the like. Furthermore, in some aspects, the one or more roadside units may include a cellular backhaul to enable communication with one or more devices in network 160 (e.g., to support CV2X communication). In some aspects, the one or more roadside units may include a rugged weatherproof housing suitable for outdoor installation in all weather conditions, and may include one or more interfaces to connect to power from an electrical grid (e.g., via an indirect connection through a light pole, a traffic signal controller, and/or the like, via a direct hardwire connection to the electrical grid, and/or the like). In some aspects, roadside platform 130 may broadcast or otherwise transmit messages indicating availability of sensor-assistance data (e.g., from infrastructure device 120) over one or more CV2X channels, and orchestrate delivery of the sensor-assistance data to one or more vehicles 110 over the one or more CV2X channels.

In some aspects, as shown in FIG. 1, roadside platform 130 may be hosted in cloud computing environment 140. Notably, while aspects described herein may describe roadside platform 130 as being hosted in cloud computing environment 140, in some aspects, roadside platform 130 may be non-cloud-based or may be partially cloud-based. In some aspects, roadside platform 130 is implemented by computing resources 145 of cloud computing environment 140. Roadside platform 130 may include a server device or a group of server devices (e.g., roadside units and/or the like).

Cloud computing environment 140 includes an environment that delivers computing as a service, whereby shared resources, services, and/or the like may be provided to ECUs 112 of vehicles 110. Cloud computing environment 140 may provide computation, software, data access, storage, and/or other services that do not require end-user knowledge of a physical location and configuration of a system and/or a device that delivers the services. As shown, cloud computing environment 140 may include computing resources 145. In some aspects, one or more computing resources 145 may correspond to roadside units of roadside platform 130, as described herein. Computing resources 145 may be configured to form at least part of a distributed sensor calibration and sensor sharing system, as described herein. Accordingly, in some aspects, computing resources 145 of roadside platform 130 may permit one or more capabilities of a distributed sensor calibration and sensor sharing system to be supported in cloud computing environment 140.

Computing resource 145 includes one or more personal computers, workstation computers, server devices, or another type of computation and/or communication device. In some aspects, computing resource 145 may host roadside platform 130. The cloud resources may include compute instances executing in computing resource 145, storage devices provided in computing resource 145, data transfer devices provided by computing resource 145, and/or the like. In some aspects, computing resource 145 may communicate with other computing resources 145 via wired connections, wireless connections, or a combination of wired and wireless connections.

As further shown in FIG. 1, computing resource 145 may include a group of cloud resources, such as one or more applications ("APPs") 145-1, one or more virtual machines ("VMs") 145-2, virtualized storage ("VSs") 145-3, one or more hypervisors ("HYPs") 145-4, or the like.

Application 145-1 includes one or more software applications (e.g., software applications associated with a distributed sensor calibration and sensor sharing system) that may be provided to or accessed by ECU 112. Application 145-1 may eliminate a need to install and execute the software applications on ECU 112. For example, application 145-1 may include software associated with roadside platform 130 and/or any other software capable of being provided via cloud computing environment 140. In some aspects, one application 145-1 may send and/or receive information to and/or from one or more other applications 145-1, via virtual machine 145-2.

Virtual machine 145-2 includes a software aspect of a machine (e.g., a computer) that executes programs like a physical machine. Virtual machine 145-2 may be either a system virtual machine or a process virtual machine, depending upon use and degree of correspondence to any real machine by virtual machine 145-2. A system virtual machine may provide a complete system platform that supports execution of a complete operating system ("OS"). A process virtual machine may execute a single program and may support a single process. In some aspects, virtual machine 145-2 may execute on behalf of a user (e.g., a user associated with vehicle 110), and may manage infrastructure of cloud computing environment 140, such as data management, synchronization, or long-duration data transfers.

Virtualized storage 145-3 includes one or more storage systems and/or one or more devices that use virtualization techniques within the storage systems or devices of computing resource 145. In some aspects, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations. In some aspects, virtualized storage 145-3 may store information associated with a distributed sensor calibration and sensor sharing system.

Hypervisor 145-4 provides hardware virtualization techniques that allow multiple operating systems (e.g., "guest operating systems") to execute concurrently on a host computer, such as computing resource 145. Hypervisor 145-4 may present a virtual operating platform to the guest operating systems and may manage the execution of the guest operating systems. Multiple instances of a variety of operating systems may share virtualized hardware resources.

Pedestrian device 150 includes one or more devices capable of receiving, generating, storing, processing, and/or providing information associated with V2X communication. For example, pedestrian device 150 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device. In some aspects, pedestrian device 150 may communicate with other devices in environment 100 according to a V2P protocol to convey information related to a presence and/or location of pedestrian device 150, movement (e.g., direction of travel, speed, and/or the like) of pedestrian device 150, and/or the like. Furthermore, in some aspects, pedestrian device 150 may receive, from other devices in environment 100, information related to traffic conditions, information related the presence and/or location of other objects, warnings to prevent collisions or accidents (e.g., when texting while walking through a busy intersection), and/or the like.

Network 160 includes one or more wired and/or wireless networks. For example, network 160 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as one or more examples. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices)

of environment 100 may perform one or more functions described as being performed by another set of devices of environment 100.

Figure 2:
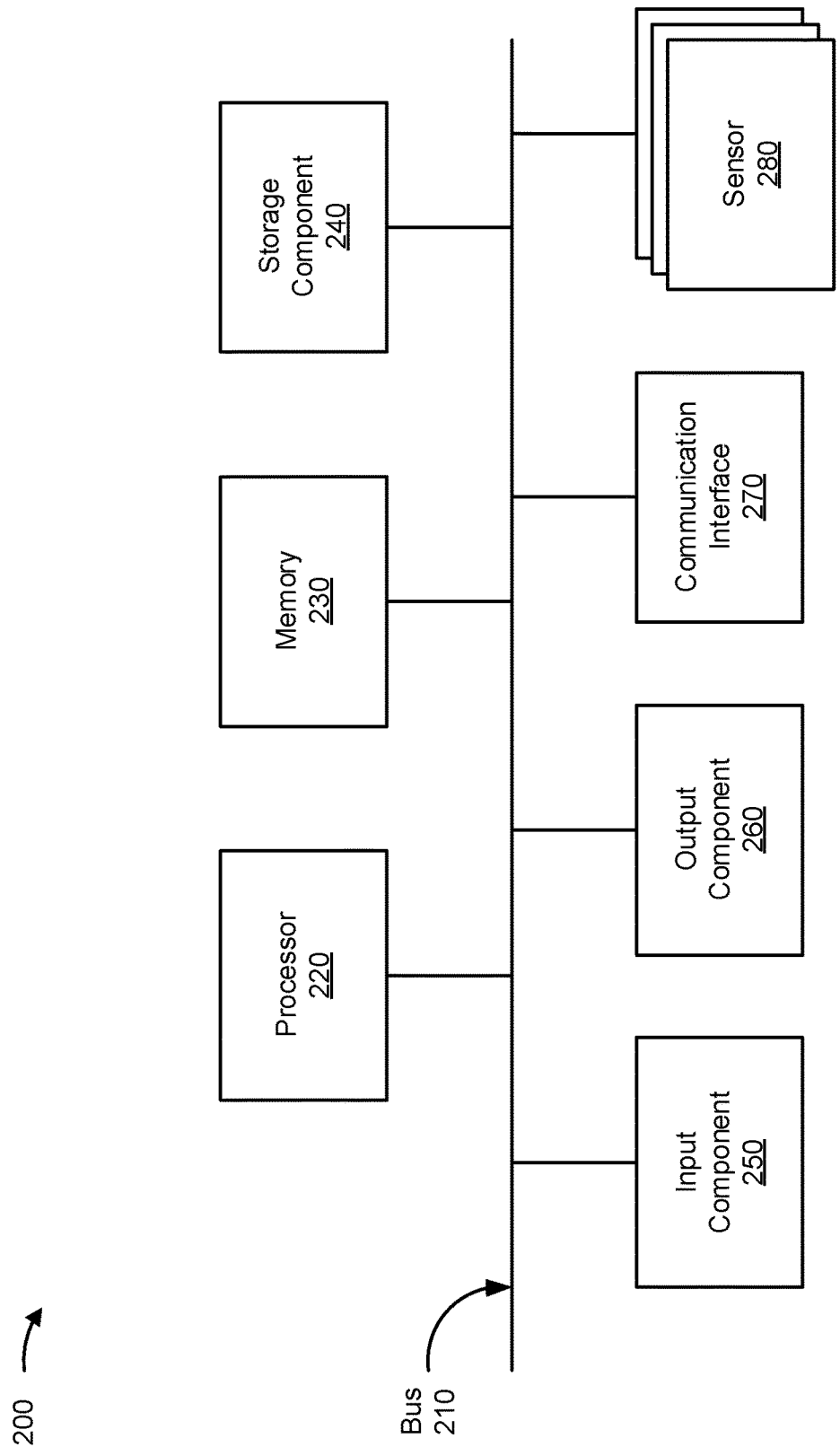
FIG. 2 is a diagram illustrating example components of one or more devices shown in FIG. 1, in accordance with various aspects of the present disclosure.

FIG. 2 is a diagram of example components of a device 200. Device 200 may correspond to vehicle 110, ECU 112, infrastructure device 120, roadside platform 130, computing resource 145, and/or pedestrian device 150. In some aspects, vehicle 110, ECU 112, infrastructure device 120, roadside platform 130, computing resource 145, and/or pedestrian device 150 may include one or more devices 200 and/or one or more components of device 200. As shown in FIG. 2, device 200 may include a bus 210, a processor 220, a memory 230, a storage component 240, an input component 250, an output component 260, a communication interface 270, and one or more sensors 280 (referred to individually as a "sensor 280" and collectively as "sensors 280").

Bus 210 includes a component that permits communication among multiple components of device 200. Processor 220 is implemented in hardware, firmware, and/or a combination of hardware and software. Processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 220 includes one or more processors capable of being programmed to perform a function. Memory 230 includes a random access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 250 includes a component that permits device 200 to receive information, such as via user input (e.g., a touch screen display, a keyboard, a keypad, a mouse, a button, a switch, and/or a microphone). Additionally, or alternatively, input component 250 may include a component for determining location (e.g., a global positioning system (GPS) component) and/or a sensor (e.g., an accelerometer, a gyroscope, an actuator, another type of positional or environmental sensor, and/or the like). Output component 260 includes a component that provides output information from device 200 (via, e.g., a display, a speaker, a haptic feedback component, an audio or visual indicator, and/or the like).

Communication interface 270 includes a transceiver-like component (e.g., a transceiver, a separate receiver, a separate transmitter, and/or the like) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, an optical interface, a coaxial interface, an infrared interface, a radio frequency (RF) interface, a universal serial bus (USB) interface, a Wi-Fi interface, a cellular network interface, and/or the like.

Sensor 280 include one or more devices capable of sensing one or more characteristics of device 200, an environment surrounding device 200, and/or the like. For example, sensor 280 may include one or more of a camera, a light detection and ranging (LIDAR) sensor, a radio detection and ranging (RADAR) sensor, a sonar sensor, an inertial measurement unit, and/or the like. Additionally, or alternatively, sensor 280 may include a magnetometer (e.g., a Hall effect sensor, an anisotropic magnetoresistive (AMR) sensor, a giant magneto-resistive sensor (GMR), and/or the like), a location sensor (e.g., a global positioning system (GPS) receiver, a local positioning system (LPS) device (e.g., that uses triangulation, multi-lateration, and/or the like), a gyroscope (e.g., a micro-electro-mechanical systems (MEMS) gyroscope or a similar type of device), an accelerometer, a speed sensor, a motion sensor, an infrared sensor, a temperature sensor, a pressure sensor, and/or the like.

Accordingly, sensor 280 may include any suitable sensor or combination of sensors that may be configured within a sensor suite to perform one or more operations, generate sensor data to permit one or more operations to be performed, and/or the like. For example, sensor 280 may be configured within a sensor suite to detect the presence of one or more objects in an environment of device 200, detect a proximity to one or more objects in the environment of device 200, determine a location of device 200, determine a speed associated with a device 200, determine a location and/or speed of one or more objects in the environment of device 200, and/or the like. As described herein, sensor data generated by sensors 280 may be communicated (e.g., via communication interface 270) to another device to permit the sensor data to be used by the other device to perform one or more operations. Furthermore, in some aspects, sensor data generated by sensors 280 may be augmented, calibrated, and/or the like using sensor-assistance data from one or more sources external to device 200.

In some aspects, device 200 includes means for performing one or more processes described herein and/or means for performing one or more operations of the processes described herein. For example, in some aspects, device 200 includes means for obtaining, from an external source, calibration data that includes a first set of measurements and corresponding timestamps related to a position of one or more objects in a reference frame associated with the external source, means for identifying a second set of measurements and corresponding timestamps related to the position of the one or more objects within a field of view of sensor 280, means for updating a calibration table to include information related to a six degrees of freedom (6DOF) position for sensor 280 based at least in part on a comparison of one or more of the first set of measurements and one or more of the second set of measurements that are determined to be most time-aligned based at least in part on the corresponding timestamps, and means for converting sensor-derived location information from a source reference frame to a reference frame associated with device 200 using the updated calibration table. In some aspects, such means may include bus 210, processor 220, memory 230, storage component 240, input component 250, output component 260, communication interface 270, sensor(s) 280, and/or any combination thereof.

In some aspects, device 200 performs one or more processes described herein. Device 200 may perform these processes based on processor 220 executing software instructions stored by a non-transitory computer-readable medium, such as memory 230 and/or storage component 240. As used herein, the term "computer-readable medium"

refers to a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein. Additionally, or alternatively, hardware circuitry may be used in place of or in combination with software instructions to perform one or more processes described herein. Thus, aspects described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
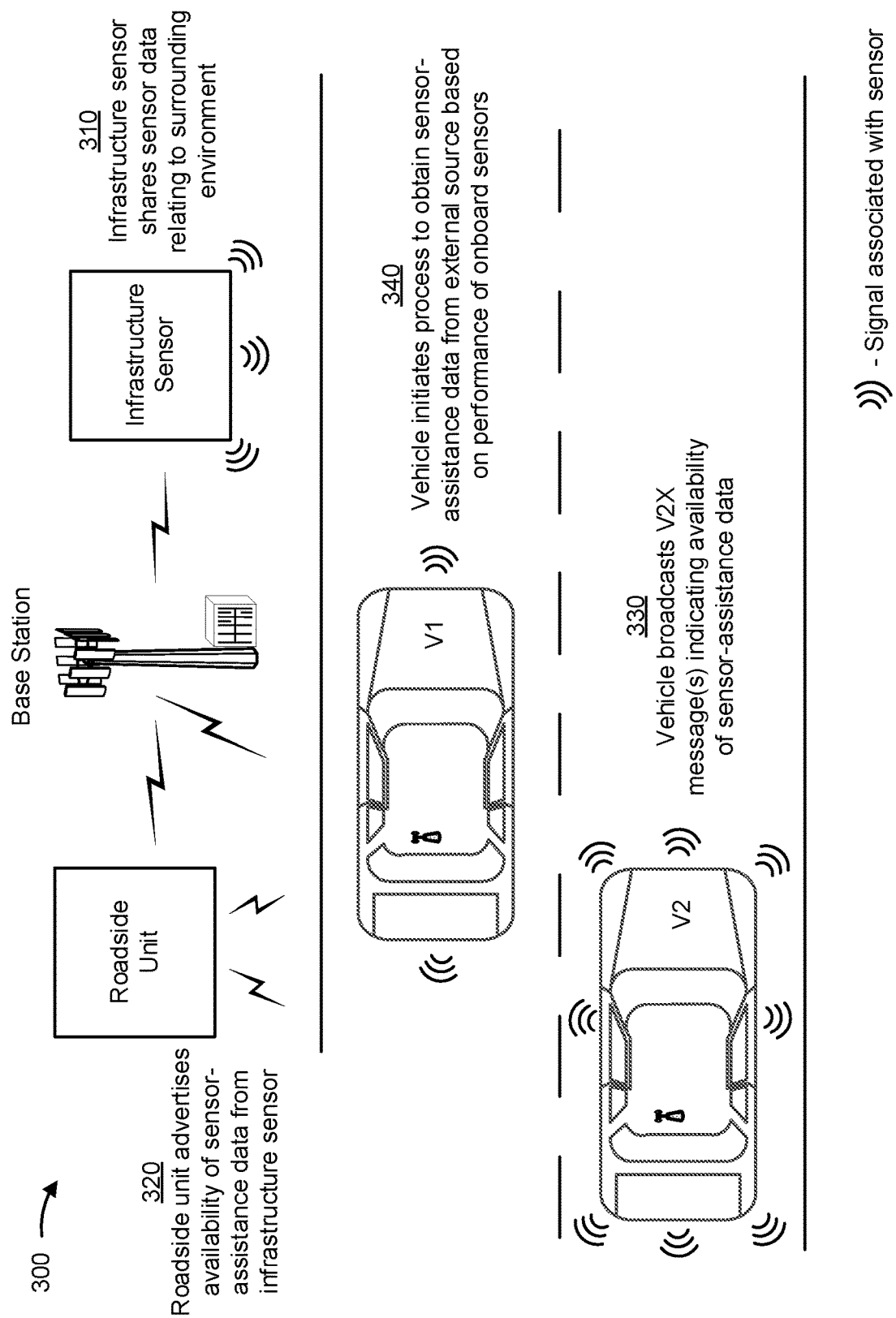
FIG. 3 is a diagram illustrating an example associated with distributed sensor calibration and sensor sharing using CV2X communication, in accordance with various aspects of the present disclosure.

FIG. 3 is a diagram illustrating an example 300 associated with distributed sensor calibration and sensor sharing using CV2X communication, in accordance with various aspects of the present disclosure. Example 300 includes a first vehicle (shown as "V1") and a second vehicle (shown as "V2") (which may be referred to herein collectively as "the vehicles"), an infrastructure sensor (e.g., infrastructure device 120), a base station (e.g., a base station of network 160), and a roadside unit (e.g., a roadside unit associated with roadside platform 130). In some aspects, the first vehicle and the second vehicle may correspond to vehicles 110 shown in FIG. 1. Accordingly, the first vehicle and second vehicle of example 300 may each include an ECU (corresponding to ECU 112) to facilitate communication with each other (e.g., V2V communication), with other vehicles (not shown), with the base station (e.g., V2N communication), with the infrastructure sensor (e.g., V2I communication), and/or with the roadside unit (e.g., V2I communication, V2C communication, V2X communication, and/or the like).

In some aspects, V2X communication among and/or between the vehicles and the roadside unit, the base station, the infrastructure sensor, and/or the like may be enabled when the vehicles, the roadside unit, the base station, the infrastructure sensor, and/or the like are within a threshold distance that permits communication over a V2X interface or V2X channel via any suitable communication protocol, such as a cellular V2X (CV2X) communication protocol that uses LTE and/or NR as an underlying enabling technology, Dedicated Short Range Communication (DSRC) that uses the WLAN-based IEEE 802.11p protocol as an enabling technology, and/or the like.

As described herein, when referring to a vehicle performing an action (e.g., receiving information, communicating with another entity, determining a reliability of a sensor system, enabling use of sensor data, using sensor data, and/or the like), it is to be understood that an ECU of the vehicle may be performing the action. In example 300, as described herein, V2X communication among and/or between the vehicles and the roadside unit, the base station, the infrastructure sensor, and/or the like may be used to implement distributed sensor calibration and/or distributed sensor sharing to augment, calibrate, and/or otherwise improve performance for one or more onboard sensors.

As shown in FIG. 3, and by reference number 310, the infrastructure sensor may share sensor data relating to a surrounding environment (e.g., with vehicles, pedestrian devices, and/or the like that may be present within the environment). For example, in some aspects, the infrastructure sensor may support various technologies to sense or otherwise perceive information related to the surrounding environment (e.g., cameras, radar, LIDAR, sonar, GNSS, odometry, inertial measurement units, machine vision, and/or the like). Furthermore, in some aspects, the information related to the surrounding environment may include presence, location, and/or movement data for various objects in the environment (e.g., information related to velocities, headings, yaw rate, and/or the like for pedestrians, bicyclists, motor vehicles, and/or the like), traffic information (e.g., maps of roadways, crosswalks, driveways, movement patterns, lane closures, speed advisories, and/or the like), weather conditions, and/or the like.

In some aspects, the infrastructure sensor may be one of a group of infrastructure sensors that are deployed in connection with a distributed sensor sharing service to augment sensor data available to vehicles, pedestrians, and/or the like. For example, the group of infrastructure sensors may be deployed in areas that frequently have dense traffic and/or congestion, dense populations, substantial foot traffic, obstacles such as road signage, foliage, blind spots, and/or the like that may otherwise cause degraded performance for onboard vehicle sensors (e.g., due to radar interference, RF shadows, optical shadows, and/or the like). Accordingly, in some aspects, the infrastructure sensor may share the sensor data related to the surrounding environment with other devices (e.g., the vehicles) to improve safety, reliability, and/or the like for ADAS features, autonomous driving features, user alerts and warnings, and/or the like. For example, whereas vehicular sensor suites are typically subject to various limitations with respect to cost, power, form factor, and/or the like, which may potentially limit performance of vehicular sensors, the infrastructure sensor may be subject to fewer restrictions because a CV2X infrastructure operator can distribute costs associated with the infrastructure sensor over a large user base.

Furthermore, the infrastructure sensor can be installed or otherwise deployed on traffic infrastructure that may impose minimal (if any) restrictions on form factor, power consumption, processing power, and/or the like, which allows the infrastructure sensor to have more capabilities and produce higher-quality sensor data than may otherwise be available using an onboard vehicle sensor suite. Additionally, in some aspects, the infrastructure sensor (or group of infrastructure sensors) can be deployed at strategic locations to ensure a clear vantage point of a particular intersection, environment, and/or the like to maximize utility of the sensor data and to minimize an impact from issues such as radar interference, RF shadows, optical shadows, and/or the like. For example, the infrastructure sensor may include a radar sensor deployed high above-ground on a roadside (e.g., on a tall light pole, electrical pole, and/or the like), which may minimize an impact from obscuring vehicles inside an RF shadow.

As further shown in FIG. 3, and by reference number 320, the roadside unit may advertise availability of sensor-assistance data from the infrastructure sensor and orchestrate delivery of the sensor-assistance data to one or more vehicles over one or more CV2X channels. For example, when a vehicle approaches an area where the infrastructure sensor is deployed, the roadside unit may notify the vehicle about the availability of the sensor data from the infrastructure sensor over a CV2X channel, such as a PC5 interface (e.g., a reference point that a UE, such as an ECU associated with a vehicle, can use to communicate with other devices over a direct channel). In this case, the vehicle and the roadside unit may communicate over a sidelink channel without communicating through the base station. Additionally, or alternatively, in some aspects, the CV2X channel may include a Uu interface, which refers to a logical interface that can be used to communicate the base station. In this way, the vehicle, the roadside unit, and/or the like may communicate with one or more network devices (e.g., an application server supporting one or more vehicle-to-network (V2N) applications, such as an application associated with the distributed sensor sharing service described herein).

As further shown in FIG. 3, and by reference number 330, one or more vehicles may broadcast a V2X message indicating availability of sensor-assistance data. For example, in some aspects, the sensor-assistance data may include movement data related to a position, speed, yaw rate, and/or the like for the vehicle broadcasting the V2X message, information related to the environment surrounding the vehicle, and/or the like. Furthermore, in some aspects, the sensor-assistance data may include calibration data to enable calibration (or recalibration) for one or more onboard sensors associated with a different vehicle. For example, in addition to including sensor data produced by one or more sensors on the vehicle, the calibration data may include source input data (e.g., image frames, video frames, RF signals, sonar data, and/or the like) and corresponding timestamps and position data for one or more objects that are detected in the environment. Accordingly, as described in further detail below, another vehicle can compare the calibration data available from the other vehicle to sensor data obtained using one or more onboard sensors (e.g., relating to ego movement, or self-movement, of the vehicle performing the calibration, observed movement of the one or more objects, and/or the like), and a result from the comparison can be used to update a local calibration table used to convert location information from a source reference frame (e.g., a sensor that generated the location information) to a common reference frame, such as a vehicle reference frame, a flat Earth reference frame, and/or the like.

As further shown in FIG. 3, and by reference number 340, one or more vehicles may initiate a process to obtain sensor-assistance data from an external source based at least in part on a performance of one or more onboard sensors. For example, in some aspects, the sensor-assistance data may include sensor data available from the infrastructure sensor, which may be requested based on the vehicle detecting degraded performance of the onboard sensor suite (e.g., due to radar interference, RF shadows, optical shadows, and/or the like). In such cases, the vehicle may communicate with the roadside unit (e.g., on a sidelink via a direct CV2X channel, using the base station as an intermediary, and/or the like) to negotiate or otherwise obtain authenticated access to the sensor data shared by the infrastructure sensor, as described in further detail below with respect to FIG. 4. Additionally, or alternatively, in some aspects, the sensor-assistance data may include calibration data available from a neighboring vehicle, which may be requested based at least in part on the vehicle determining that a confidence level associated with the one or more onboard sensors fails to satisfy a threshold value. In such cases, the vehicle may communicate with the neighboring vehicle (e.g., on a sidelink via a direct CV2X channel, such as a PC5 interface) to obtain various measurements, timestamps, sensor input data, and/or the like to calibrate the onboard sensors, as described in further detail below with respect to FIG. 5.

As indicated above, FIG. 3 is provided merely as one or more examples. Other examples may differ from what is described with regard to FIG. 3.

Figure 4:
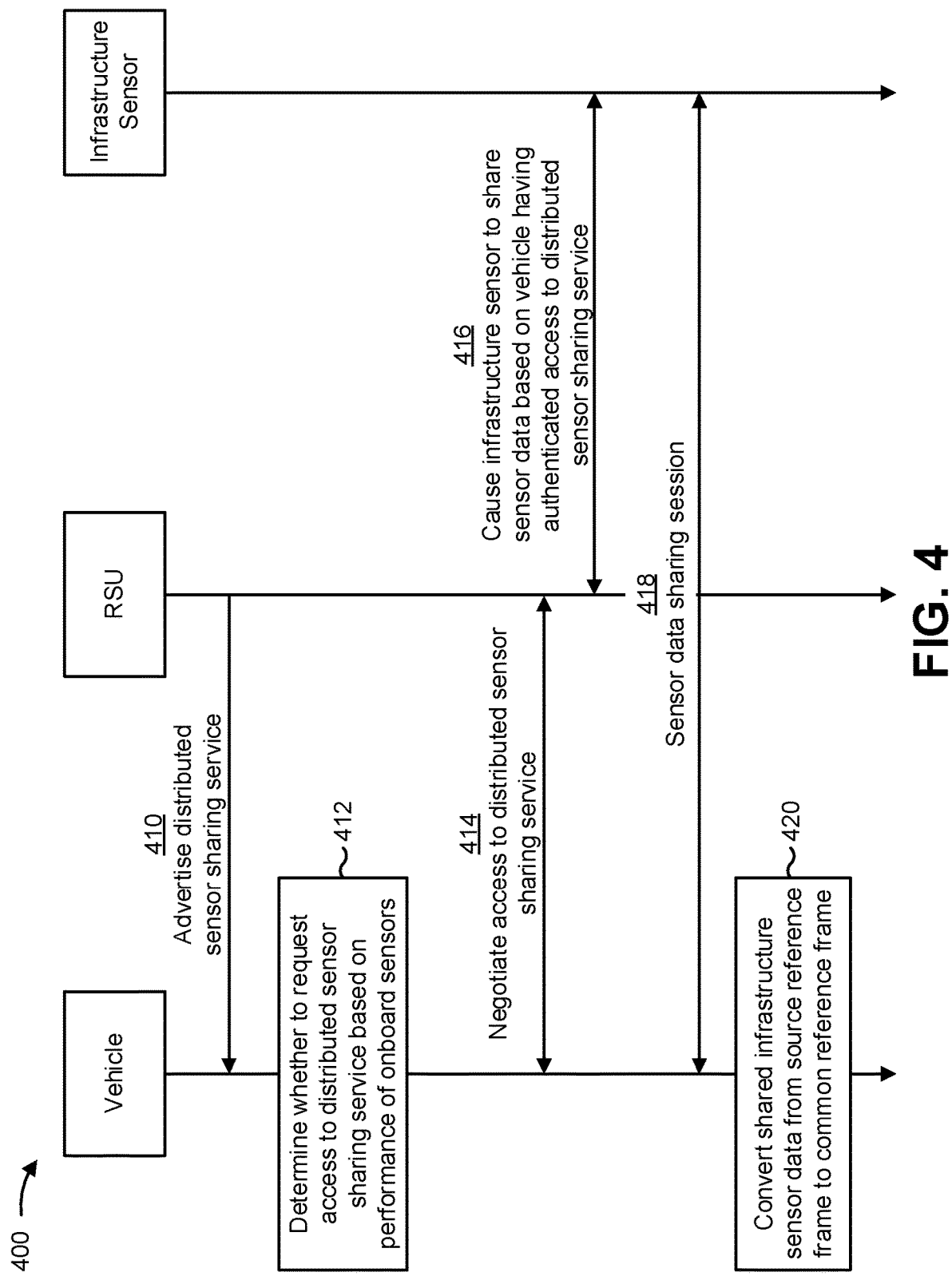
FIG. 4 is a diagram illustrating an example signaling flow in a distributed sensor sharing system using CV2X communication, in accordance with various aspects of the present disclosure.

FIG. 4 is a diagram illustrating an example signaling flow 400 in a distributed sensor sharing system using CV2X communication, in accordance with various aspects of the present disclosure. As shown in FIG. 4, example signaling flow 400 includes communications among various devices in a wireless network, such as a vehicle (e.g., vehicle 110), a roadside unit (RSU) (e.g., an RSU associated with roadside platform 130), and an infrastructure sensor (e.g., an infrastructure sensor associated with infrastructure device 120). In some aspects, the infrastructure sensor may be deployed in an area or environment that has dense traffic, a high population, significant quantities of vulnerable road users (e.g., pedestrians, bicyclists, and/or the like), significant foliage or other obstacles that may create RF shadows and/or optical shadows, and/or the like. Accordingly, the infrastructure sensor and the RSU may be deployed in conjunction as part of a distributed sensor sharing service to provide sensor data to augment or otherwise aid an onboard sensor suite associated with the vehicle (e.g., in areas where environmental conditions may interfere with performance of onboard vehicle sensors).

As shown in FIG. 4, and by reference number 410, the RSU may broadcast one or more messages to advertise availability of the distributed sensor sharing service over a CV2X channel (e.g., a short-range cellular communication channel). For example, in some aspects, the one or more messages may include a wireless access in vehicular environments (WAVE) service advertisement (WSA) that includes one or more provider service identifiers (PSIDs) to identify the distributed sensor sharing service and information to enable vehicles or other devices to access the distributed sensor sharing service. For example, in some aspects, the WSA may include information identifying a CV2X channel and an Internet Protocol (IP) address to be used to access the distributed sensor sharing service and thereby obtain sensor data related to a state of the area in which the infrastructure sensor is deployed (e.g., data related to presence, location, and/or movement of objects in the environment, data related to weather conditions, traffic conditions, travel advisories, and/or the like).

As further shown in FIG. 4, and by reference number 412, the vehicle may determine whether to request access to the distributed sensor sharing service based on performance of one or more onboard sensors (e.g., an onboard camera, LIDAR sensor, radar sensor, sonar sensor, inertial measurement unit, GNSS receiver, and/or the like). For example, in some aspects, the vehicle may determine that performance of the one or more onboard sensors has degraded due to detecting radar interference (e.g., based on detecting external radar signals, a quantity of neighboring vehicles, and/or the like that satisfies a threshold), an RF shadow (e.g., based on detecting one or more objects that may cause an RF signal to be blocked, reflected, attenuated, and/or the like), an optical shadow (e.g., based on detecting one or more objects that may be obstructing a field of view for one or more optical sensors), and/or the like. In other examples, the vehicle may determine that performance of the one or more onboard sensors has degraded due to a confidence level failing to satisfy a threshold value, and/or the like.

As further shown in FIG. 4, and by reference number 414, the vehicle may communicate with the RSU to negotiate access to the distributed sensor sharing service based at least in part on the performance of the one or more onboard sensors (e.g., when there is radar interference, an RF shadow, an optical shadow, and/or other conditions that may hamper performance of the onboard sensors). For example, in some aspects, the vehicle may communicate with the RSU to negotiate access to the distributed sensor sharing service over a short-range CV2X channel indicated in the WSA broadcasted by the RSU. Additionally, or alternatively, the vehicle may communicate with the RSU to negotiate access to the distributed sensor sharing service over a wide-range communication channel associated with a wireless wide area network (WWAN) (e.g., an LTE or 4G network, an NR or 5G network, and/or the like). In some aspects, when negotiating access to the distributed sensor sharing service, the vehicle may provide, to the RSU, information to obtain authenticated access to the distributed sensor sharing service. For example, in some aspects, the vehicle may provide the RSU with one or more authentication credentials associated with an existing subscription to the distributed sensor sharing service. In another example, the vehicle may provide payment information to access the distributed sensor sharing service (e.g., based on a per-use fee, an amount of sensor data to be obtained, and/or the like).

As further shown in FIG. 4, and by reference number 416, the RSU may cause or otherwise trigger the infrastructure sensor to share sensor data with the vehicle based at least in part on the RSU indicating that the vehicle has authenticated access to the distributed sensor sharing service. For example, in some aspects the RSU may communicate with the infrastructure sensor over a short-range CV2X channel, over a wide-range communication channel associated with the WWAN, over a wired or wireless backhaul, and/or the like. Furthermore, in some aspects, the RSU may instruct the infrastructure sensor to share relevant sensor data with the vehicle. For example, the RSU may instruct the infrastructure sensor to share all sensor data obtained by the infrastructure sensor with the vehicle. Additionally, or alternatively, in some aspects, the vehicle may have one or more onboard sensors that are functioning well and one or more onboard sensors that are experiencing degraded performance, and the vehicle may request specific sensor data to augment or otherwise aid only the one or more onboard sensors that are experiencing degraded performance. Accordingly, in some aspects, the RSU may further indicate, to the infrastructure sensor, certain types of sensor data to be shared with the vehicle (e.g., optical sensor data, RF sensor data, object detection data, and/or the like), sensor data for certain areas in the environment (e.g., areas that the vehicle cannot perceive due to shadowing), and/or the like.

As further shown in FIG. 4, and by reference number 418, the vehicle may establish a sensor data sharing session with the infrastructure sensor to obtain the sensor data from the infrastructure sensor. For example, the sensor data sharing session may be established over the WWAN, which may offer a longer range, higher bandwidth, greater reliability, and/or the like relative to a short-range V2X channel. As further shown in FIG. 4, and by reference number 420, the vehicle may convert the sensor data shared by the infrastructure sensor from a source reference frame (e.g., a reference frame associated with the infrastructure sensor) to a common reference frame associated with the vehicle. For example, in some aspects, the common reference frame may be a reference frame of the vehicle, a flat Earth reference frame, an Earth-centered Earth-fixed reference frame, and/or the like. In this way, the infrastructure sensor data may be converted to a reference frame that enables the infrastructure sensor data to be integrated with onboard sensor data, an onboard software stack, and/or other components of the vehicle that may be used to support ADAS features, autonomous driving, and/or the like (e.g., using a simultaneous localization and mapping (SLAM) algorithm, an algorithm that enables detection and tracking of other moving objects (DATMO), a real-time locating system (RTLS), a Kalman filter, and/or the like).

In some aspects, the sensor data shared by the infrastructure sensor may be converted from the source reference frame to the common reference frame associated with the vehicle using a local calibration table that can be used by the vehicle to verify integrity of the conversion of location information from the source reference frame to the common reference frame, verify that measurements performed in the source reference frame (e.g., by the infrastructure sensor) are accurate, correct abnormalities in the measurements performed in the source reference frame, and/or the like. However, in some cases, the calibration table may become unreliable (e.g., after certain components on the vehicle are repaired, such as a windshield, following an impact that causes one or more onboard sensors to shift positions, and/or the like). Accordingly, as discussed in further detail below with reference to FIG. 5, the vehicle may communicate with one or more other devices in the environment (e.g., a neighboring vehicle) to update the calibration table in order to ensure that onboard sensor data, infrastructure sensor data, and/or the like is accurately converted to the common reference frame, to reduce distortions in the representation of the environment surrounding the vehicle.

As indicated above, FIG. 4 is provided merely as one or more examples. Other examples may differ from what is described with regard to FIG. 4.

Figure 5:
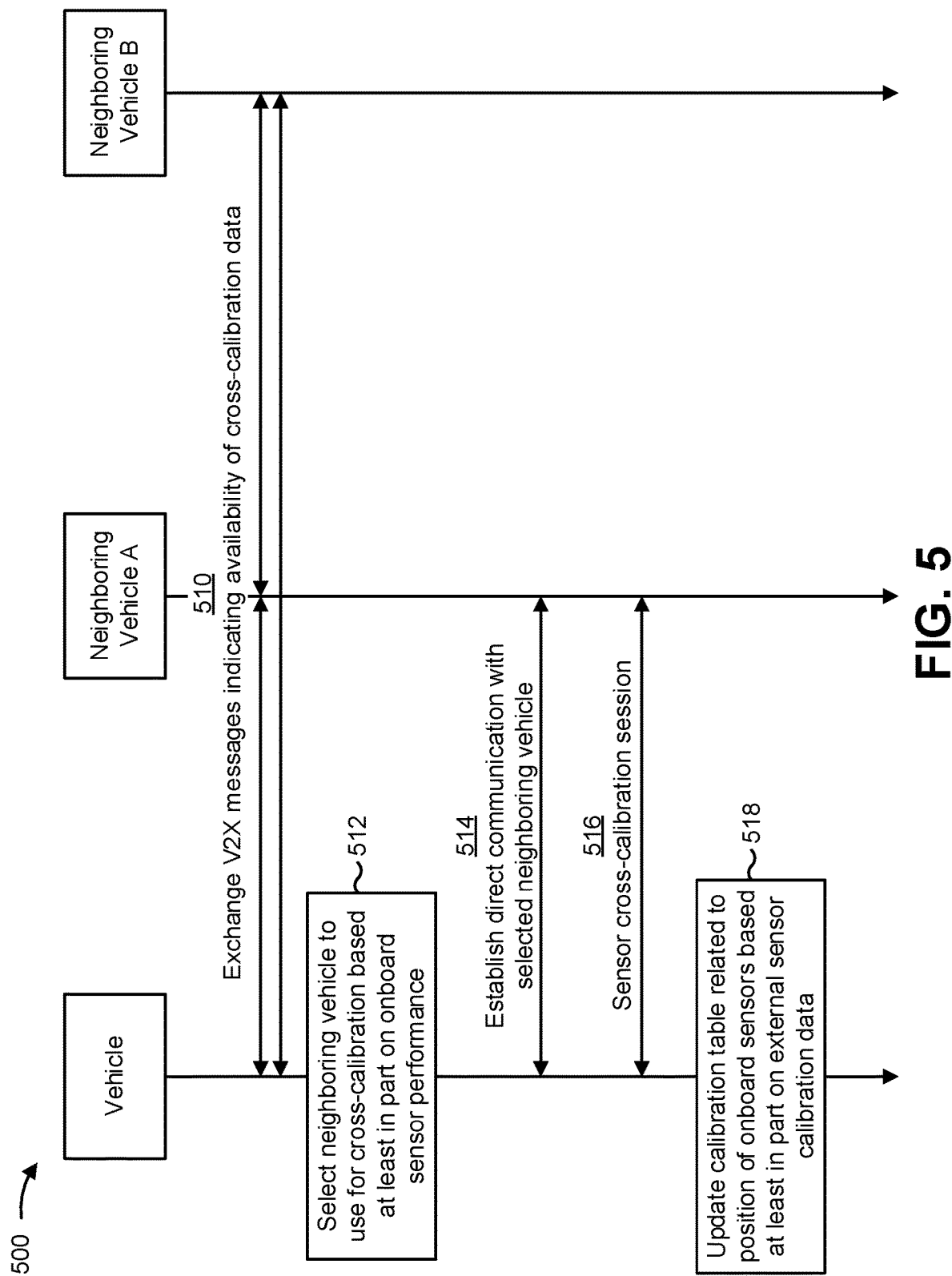
FIG. 5 is a diagram illustrating an example signaling flow in a distributed sensor calibration system using CV2X communication, in accordance with various aspects of the present disclosure.

FIG. 5 is a diagram illustrating an example signaling flow 500 in a distributed sensor calibration system using CV2X communication, in accordance with various aspects of the present disclosure. As shown in FIG. 5, example signaling flow 500 includes communication among various vehicles in a wireless network (e.g., V2X communication, CV2X communication, V2V communication, and/or the like). For example, as shown in FIG. 5, the example signaling flow 500 includes communication among a vehicle having one or more onboard sensors to be calibrated and one or more neighboring vehicles (illustrated as neighboring vehicles A and B) that may provide sensor-assistance data to the vehicle to enable calibration of the onboard sensor(s).

As shown in FIG. 5, and by reference number 510, the vehicle and the neighboring vehicles may exchange one or more V2X messages while the vehicle and the neighboring vehicles are within V2X communication range. For example, in some aspects, the one or more V2X messages may include a basic safety message (BSM), a traffic information message (TIM), a MAP message to convey geographic road information, a cooperative awareness message (CAM), a distributed environment notification message (DENM), a signal phase and timing (SPaT) message, and/or the like. Accordingly, the V2X messages may generally include information related to movement of the vehicle and the neighboring vehicles (e.g., position, speed, heading, yaw rate, steering wheel angle, and/or the like), information related to objects that are detected in the surrounding environment, and/or the like. Furthermore, in some aspects, the one or more V2X messages may indicate availability of cross-calibration data.

Accordingly, as further shown in FIG. 5, and by reference number 512, the vehicle may select, among the neighboring vehicle(s) indicating availability of cross-calibration data, a particular neighboring vehicle to use for cross-calibration based at least in part on performance of one or more onboard sensors. For example, in some aspects, the vehicle may select a neighboring vehicle to use for cross-calibration based at least in part on determining that a confidence level associated with the one or more onboard sensors, a confidence level associated with a local calibration table, and/or the like, fail to satisfy a threshold value. Furthermore, when there are multiple neighboring vehicles (e.g., neighboring vehicles A and B) indicating availability of cross-calibration data, the neighboring vehicle to be used for cross-calibration may be selected based on one or more factors. For example, in example signaling flow 500, the vehicle may select neighboring vehicle A based on a location of neighboring vehicle A (e.g., the vehicle may select the closest neighboring vehicle), sensor capabilities of neighboring vehicle A (e.g., the vehicle may select a neighboring vehicle having a most robust or most reliable sensor suite, which may be determined based on a calibration confidence level that the neighboring vehicles indicate in the V2X messages), a speed at which neighboring vehicle A is traveling (e.g., the vehicle may select a moving vehicle over a stationary vehicle or a fast-moving vehicle to ensure availability of a sufficient quantity of distinct measurements to enable calibration), a direction in which neighboring vehicle A is traveling (e.g., the vehicle may select a neighboring vehicle traveling in the same direction, to maximize a likelihood that the vehicles will remain within V2X communication range until the cross-calibration is complete), and/or the like.

As further shown in FIG. 5, and by reference number 514, the vehicle may establish a direct communication with the selected neighboring vehicle. For example, in some aspects, the vehicle and the neighboring vehicle may establish a direct communication on a sidelink via a PC5 interface. As further shown in FIG. 5, and by reference number 516, the vehicle and the selected neighboring vehicle may establish a sensor cross-calibration session in which the vehicle receives sensor data as well as measurements, timestamps, input data, and/or the like from the neighboring vehicle. Accordingly, as further shown in FIG. 5, and by reference number 518, the vehicle may update a local calibration table related to a position (e.g., a six degrees of freedom (6DOF) position) of one or more onboard sensors to be calibrated based at least in part on the external sensor calibration data received from the neighboring vehicle. For example, as described herein, the vehicle may receive a threshold quantity of measurements, corresponding timestamps, input data, and/or the like to enable calibration during the cross-calibration session (e.g., eleven (11) or more measurements may generally be needed to calibrate a 6DOF position for a camera), and the cross-calibration session may be closed or otherwise terminated after obtaining the threshold quantity of measurements, corresponding timestamps, input data, and/or the like.

For example, as described herein, the cross-calibration session may be performed to calibrate an onboard camera associated with the vehicle using calibration data received from the neighboring vehicle. However, in some aspects, similar techniques as described herein can be applied to calibrate other suitable sensor types.

In general, the local calibration table associated with the vehicle may include calibration data related to a 6DOF position of the camera in the vehicle reference frame, and the vehicle may further maintain information related to a current 6DOF position of the vehicle in a particular global (or common) reference frame at different times (e.g., flat Earth reference frame, Earth-centered Earth-fixed reference frame, and/or the like). In some aspects, the 6DOF position of the vehicle at each different time may be associated with a timestamp, which may be expressed with reference to Coordinated Universal Time (UTC) or another suitable derivative of global time (e.g., through GNSS and/or other time synchronization techniques).

Accordingly, using a CV2X interface, the vehicle may receive calibration data from the neighboring vehicle, which may include information related to a 6DOF position of the neighboring vehicle at different times. Additionally, or alternatively, the calibration data may include information related to a 6DOF position of one or more elements that are visually observable in an environment surrounding the vehicle. For example, the calibration data may include information related to a 6DOF position of one or more visually observable elements on the neighboring vehicle (e.g., head lights, license plate(s), logos, and/or the like), visually observable elements in the surrounding environment (e.g., road signage, other vehicles, pedestrians, traffic infrastructure, and/or the like). Furthermore, the calibration data may associate a timestamp with each distinct 6DOF position of the neighboring vehicle, the visually observable elements on the neighboring vehicle, visually observable elements in the surrounding environment, and/or the like.

In some aspects, the vehicle may detect a position of one or more objects of interest (e.g., the neighboring vehicle, a visually observable element on the neighboring vehicle, a visually observable element in the surrounding environment, and/or the like) within a field of view of the onboard sensor. For example, when the onboard sensor is a camera, the position of the one or more objects of interest may generally correspond to a set of pixels in a two-dimensional (2D) sensing element associated with the camera. Furthermore, in some aspects, the vehicle may associate a timestamp (e.g., a UTC-derived timestamp) with the set of pixels that correspond to the position of the one or more objects of interest. Accordingly, in some aspects, the vehicle may identify (based on the timestamps) a most time-aligned 6DOF position of the vehicle, 6DOF position of the one or more objects of interest, and set of pixels that correspond to the object of interest. For example, as mentioned above, each 6DOF position may be associated with a timestamp derived from a common reference time (e.g., UTC), and the 6DOF positions and set of pixels that are most time-aligned may correspond to a set of measurements for which a time difference is smallest among available measurements.

In some aspects, the vehicle may then update the calibration table for the one or more onboard sensors based at least in part on the most time-aligned 6DOF position of the vehicle, 6DOF position of the one or more objects of interest, and set of pixels that correspond to the object of interest. For example, in some aspects, the vehicle may use prior calibration information associated with the one or more onboard sensors to project an expected set of pixels on the onboard sensor where the object(s) of interest should appear, and an actual set of pixels where the object(s) of interest appear may be compared with the expected set of pixels to estimate an error in the prior calibration information (e.g., based at least in part on a difference between the expected and actual location of the object(s) of interest within the field of view of the onboard sensor).

When the estimated error satisfies a threshold value (e.g., indicating that the onboard sensor is miscalibrated), the vehicle may repeat this procedure until a threshold quantity of measurements (e.g., at least 11 for a camera) allow the calibration table to be suitably updated. Accordingly, once the calibration table has been updated, existing settings in the calibration table that relate to a 6DOF position for the one or more onboard sensors within the vehicle reference frame may be replaced with new settings determined using the calibration data obtained from the neighboring vehicle. Additionally, or alternatively, the vehicle may determine that the calibration table does not need to be updated, when the estimated error fails to satisfy the threshold value (e.g., indicating that the onboard sensor is accurately calibrated). Furthermore, in cases where the calibration table is updated, the vehicle may generate a user notification to indicate a mismatch between the information related to the 6DOF position for the one or more onboard sensors and the existing information in the calibration table, prior to using the new calibration settings (e.g., where the estimated error in the prior calibration information satisfies the threshold value). In such cases, the calibration table may be updated based at least in part on a user input responsive to the user notification. For example, there may be a brief period of time in which sensor data is unavailable and/or unreliable while the settings in the calibration table are updated. Accordingly, providing the user notification may allow the driver of the vehicle to temporarily stop moving while the calibration table is safely updated, allow the driver to defer updating the calibration table until a later time when the calibration table can be safely updated, alert the driver that certain ADAS features may be temporarily disrupted, and/or the like.

In this way, the vehicle may use the calibration data from the neighboring vehicle to update the calibration table used to convert location information from a source reference frame (e.g., a reference frame associated with the onboard sensors, an external sensor source, and/or the like) to a common reference frame (e.g., a vehicle reference frame, a flat Earth reference frame, and/or the like that may be used to support ADAS features, autonomous driving, and/or the like). In this way, the vehicle may ensure that location information is accurately converted from the source reference frame to the common reference frame, verify that measurements performed in the source reference frame are accurate, correct abnormalities in the measurements performed in the source reference frame, and/or the like, which may improve performance of the ADAS features, autonomous driving features, road safety, and/or the like. Furthermore, the distributed sensor calibration techniques described herein may allow the vehicle to calibrate the onboard sensors while the vehicle is operating on the roadway, which may conserve resources, improve safety, and/or the like by avoiding a need to calibrate the onboard sensors at a vehicle dealership, repair facility, and/or the like.

As indicated above, FIG. 5 is provided merely as one or more examples. Other examples may differ from what is described with regard to FIG. 5.

FIG. 6 is a flow chart of an example process 600 for distributed sensor calibration and sensor sharing using CV2X communication. In some aspects, one or more process blocks of FIG. 6 may be performed by a device associated with a vehicle (e.g., ECU 112 associated with vehicle 110 and/or the like). In some aspects, one or more process blocks of FIG. 6 may be performed by another device or a group of devices separate from or including the device associated with the vehicle, such as an infrastructure device (e.g., infrastructure device 120), a roadside platform (e.g., roadside platform 130), a pedestrian device (e.g., pedestrian device 150), and/or the like.

As shown in FIG. 6, process 600 may include obtaining, from an external source, calibration data that includes a first set of measurements and corresponding timestamps related to a position of one or more objects in a reference frame associated with the external source (block 610). For example, the device (e.g., using computing resource 145, processor 220, memory 230, storage component 240, input component 250, output component 260, communication interface 270, sensor 280, and/or the like) may obtain, from an external source, calibration data that includes a first set of measurements and corresponding timestamps related to a position of one or more objects in a reference frame associated with the external source, as described above.

As further shown in FIG. 6, process 600 may include identifying a second set of measurements and corresponding timestamps related to the position of the one or more objects within a field of view of one or more onboard sensors associated with a vehicle (block 620). For example, the device (e.g., using computing resource 145, processor 220, memory 230, storage component 240, input component 250, output component 260, communication interface 270, sensor 280, and/or the like) may identify a second set of measurements and corresponding timestamps related to the position of the one or more objects within a field of view of one or more onboard sensors associated with a vehicle, as described above.

As further shown in FIG. 6, process 600 may include updating a calibration table to include information related to a 6DOF position for the one or more onboard sensors based at least in part on a comparison of one or more of the first set of measurements and one or more of the second set of measurements that are determined to be most time-aligned based at least in part on the corresponding timestamps (block 630). For example, the device (e.g., using computing resource 145, processor 220, memory 230, storage component 240, input component 250, output component 260, communication interface 270, sensor 280, and/or the like) may update a calibration table to include information related to a 6DOF position for the one or more onboard sensors based at least in part on a comparison of one or more of the first set of measurements and one or more of the second set of measurements that are determined to be most time-aligned based at least in part on the corresponding timestamps, as described above.

As further shown in FIG. 6, process 600 may include converting sensor-derived location information from a source reference frame to a reference frame associated with the vehicle using the updated calibration table (block 640). For example, the device (e.g., using computing resource 145, processor 220, memory 230, storage component 240, input component 250, output component 260, communication interface 270, sensor 280, and/or the like) may convert sensor-derived location information from a source reference frame to a reference frame associated with the vehicle using the updated calibration table, as described above.

Process 600 may include additional aspects, such as any single aspect or any combination of aspects described below and/or in connection with one or more other processes described elsewhere herein.

In a first aspect, the device requests the calibration data from the external source over a CV2X interface based at least in part on a confidence level associated with the one or more onboard sensors associated with the vehicle failing to satisfy a threshold value.

In a second aspect, alone or in combination with the first aspect, the external source is a neighboring vehicle and the device requests the calibration data from the neighboring vehicle further based at least in part on one or more of a location of the neighboring vehicle, a direction in which the neighboring vehicle is moving, a speed at which the neighboring vehicle is moving, a sensor configuration associated with the neighboring vehicle, or a CV2X message received from the neighboring vehicle indicating availability of the calibration data.

In a third aspect, alone or in combination with one or more of the first and second aspects, the device projects, within the field of view of the one or more onboard sensors, an expected position of the one or more objects based at least in part on the calibration data and existing information in the calibration table, estimates an error in the 6DOF position for the one or more onboard sensors based at least in part on a difference between the expected position of the one or more objects and an actual position of the one or more objects within the field of view of the one or more onboard sensors, and updates the calibration table based at least in part on the estimated error in the 6DOF position.

In a fourth aspect, alone or in combination with one or more of the first through third aspects, the device generates a user notification indicating a mismatch between the information related to the 6DOF position for the one or more onboard sensors and the existing information in the calibration table based at least in part on the estimated error satisfying a threshold value and updates the calibration table further based at least in part on a user input responsive to the user notification.

In a fifth aspect, alone or in combination with one or more of the first through fourth aspects, the one or more objects correspond to one or more visually observable elements in an environment around the vehicle.

In a sixth aspect, alone or in combination with one or more of the first through fifth aspects, the sensor-derived location information is obtained from the one or more onboard sensors, and the source reference frame is associated with the one or more onboard sensors.

In a seventh aspect, alone or in combination with one or more of the first through sixth aspects, the sensor-derived location information is obtained from an infrastructure sensor, and the source reference frame is associated with the infrastructure sensor.

In an eighth aspect, alone or in combination with one or more of the first through seventh aspects, the device receives, from a roadside unit, a wireless service advertisement indicating availability of a distributed sensor sharing service, and obtains the sensor-derived location information from the infrastructure sensor based at least in part on the wireless service advertisement.

In a ninth aspect, alone or in combination with one or more of the first through eighth aspects, the wireless service advertisement includes information identifying a cellular vehicle-to-everything (CV2X) channel and/or an IP address for obtaining the sensor-derived location information from the infrastructure sensor.

In a tenth aspect, alone or in combination with one or more of the first through ninth aspects, the sensor-derived location information is obtained from the infrastructure sensor based at least in part on providing, to the roadside unit, information to obtain authenticated access to the distributed sensor sharing service.

In an eleventh aspect, alone or in combination with one or more of the first through tenth aspects, the device requests access to the distributed sensor sharing service based at least in part on detecting one or more of radar interference, a radio frequency shadow, or an optical shadow causing degraded performance for the one or more onboard sensors.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, performed by a device, comprising:
obtaining, from an external source, calibration data that includes a first set of measurements and corresponding timestamps related to a position of one or more objects in a reference frame associated with the external source, the calibration data being obtained from the external source based at least in part on a speed at which the external source is traveling, a direction of travel of the device, and a direction of travel of the external source, wherein the speed at which the external source is traveling is greater than zero;
identifying a second set of measurements and corresponding timestamps related to the position of the one or more objects within a field of view of one or more onboard sensors associated with a vehicle as the vehicle moves from a first location to a second location;
determining a third set of measurements related to the position of the one or more objects within the field of view of the one or more onboard sensors using a calibration table;
estimating an error associated with the calibration table based at least in part on the second set of measurements and the third set of measurements;
determining that the estimated error associated with the calibration table satisfies a threshold value;
updating the calibration table to include information related to a six degrees of freedom (6DOF) position for the one or more onboard sensors based at least in part on a comparison of one or more of the first set of measurements and one or more of the second set of measurements that are determined to be most time-aligned based at least in part on the corresponding timestamps; and
converting sensor-derived location information from a source reference frame to a reference frame associated with the vehicle using the updated calibration table.

2. The method of claim 1, further comprising:
requesting the calibration data from the external source over a cellular vehicle-to-everything (CV2X) interface based at least in part on a confidence level associated with the one or more onboard sensors associated with the vehicle failing to satisfy a threshold value.

3. The method of claim 2, wherein the external source is a neighboring vehicle, and wherein the calibration data is requested from the neighboring vehicle further based at least in part on one or more of a location of the neighboring vehicle, a sensor configuration associated with the neighboring vehicle, or a CV2X message received from the neighboring vehicle indicating availability of the calibration data.

4. The method of claim 1, wherein estimating the error associated with the calibration table comprises:
projecting, within the field of view of the one or more onboard sensors, an expected set of pixels corresponding to an expected position of the one or more objects based at least in part on the calibration data and existing information in the calibration table; and
estimating an error in the 6DOF position for the one or more onboard sensors based at least in part on a difference between the expected set of pixels and an actual set of pixels corresponding to an actual position of the one or more objects within the field of view of the one or more onboard sensors, wherein the calibration table is updated based at least in part on the estimated error in the 6DOF position.

5. The method of claim 4, further comprising:
generating a user notification indicating a mismatch between the information related to the 6DOF position for the one or more onboard sensors and the existing information in the calibration table based at least in part on the estimated error satisfying a threshold value, wherein the calibration table is updated further based at least in part on a user input responsive to the user notification.

6. The method of claim 1, wherein the one or more objects correspond to one or more visually observable elements in an environment around the vehicle.

7. The method of claim 1, wherein the sensor-derived location information is obtained from the one or more onboard sensors, and wherein the source reference frame is associated with the one or more onboard sensors.

8. The method of claim 1, wherein the sensor-derived location information is obtained from an infrastructure sensor, and wherein the source reference frame is associated with the infrastructure sensor.

9. The method of claim 8, further comprising:
receiving, from a roadside unit, a wireless service advertisement indicating availability of a distributed sensor sharing service; and
obtaining the sensor-derived location information from the infrastructure sensor based at least in part on the wireless service advertisement.

10. The method of claim 9, wherein the wireless service advertisement includes information identifying one or more of a cellular vehicle-to-everything (CV2X) channel or an Internet Protocol address for obtaining the sensor-derived location information from the infrastructure sensor.

11. The method of claim 9, wherein the sensor-derived location information is obtained from the infrastructure sensor based at least in part on providing, to the roadside unit, information to obtain authenticated access to the distributed sensor sharing service.

12. The method of claim 9, further comprising:
requesting access to the distributed sensor sharing service based at least in part on detecting one or more of radar interference, a radio frequency shadow, or an optical shadow causing degraded performance for the one or more onboard sensors.

13. A device, comprising:
a memory; and
one or more processors coupled to the memory, the one or more processors configured to:
obtain, from an external source, calibration data that includes a first set of measurements and corresponding timestamps related to a position of one or more objects in a reference frame associated with the external source, the calibration data being obtained from the external source based at least in part on a speed at which the external source is traveling, a direction of travel of the device, and a direction of travel of the external source, wherein the speed at which the external source is traveling is greater than zero;
identify a second set of measurements and corresponding timestamps related to the position of the one or more objects within a field of view of one or more onboard sensors associated with a vehicle as the vehicle moves from a first location to a second location;
determine a third set of measurements related to the position of the one or more objects within the field of view of the one or more onboard sensors using a calibration table;
estimate an error associated with the calibration table based at least in part on the second set of measurements and the third set of measurements;
determine that the estimated error associated with the calibration table satisfies a threshold value;
update the calibration table to include information related to a six degrees of freedom (6DOF) position for the one or more onboard sensors based at least in part on a comparison of one or more of the first set of measurements and one or more of the second set of measurements that are determined to be most time-aligned based at least in part on the corresponding timestamps; and convert sensor-derived location information from a source reference frame to a reference frame associated with the vehicle using the updated calibration table.

14. The device of claim 13, wherein the one or more processors are further configured to:

request the calibration data from the external source over a cellular vehicle-to-everything (C2VX) interface based at least in part on a confidence level associated with the one or more onboard sensors associated with the vehicle failing to satisfy a threshold value.

15. The device of claim 13, wherein the one or more processors, when estimating the error associated with the calibration table, are further configured to:

project, within the field of view of the one or more onboard sensors, an expected set of pixels corresponding to an expected position of the one or more objects based at least in part on the calibration data and existing information in the calibration table; and estimate an error in the 6DOF position for the one or more onboard sensors based at least in part on a difference between the expected set of pixels and an actual set of pixels corresponding to an actual position of the one or more objects within the field of view of the one or more onboard sensors, wherein the calibration table is updated based at least in part on the estimated error in the 6DOF position.

16. The device of claim 13, wherein the one or more objects correspond to one or more visually observable elements in an environment around the vehicle.

17. The device of claim 13, wherein the one or more processors are further configured to:

receive, from a roadside unit, a wireless service advertisement indicating availability of a distributed sensor sharing service; and obtain the sensor-derived location information from an infrastructure sensor associated with the distributed sensor sharing service based at least in part on the wireless service advertisement.

18. The device of claim 17, wherein the one or more processors are further configured to:

request access to the distributed sensor sharing service based at least in part on detecting one or more of radar interference, a radio frequency shadow, or an optical shadow causing degraded performance for the one or more onboard sensors.

19. A non-transitory computer-readable medium storing one or more instructions, the one or more instructions comprising:

one or more instructions that, when executed by one or more processors of a device, cause the one or more processors to:

obtain, from an external source, calibration data that includes a first set of measurements and corresponding timestamps related to a position of one or more objects in a reference frame associated with the external source, the calibration data being obtained from the external source based at least in part on a speed at which the external source is traveling, a direction of travel of the device, and a direction of travel of the external source, wherein the speed at which the external source is traveling is greater than zero;

identify a second set of measurements and corresponding timestamps related to the position of the one or more objects within a field of view of one or more onboard sensors associated with a vehicle as the vehicle moves from a first location to a second location;

determine a third set of measurements related to the position of the one or more objects within the field of view of the one or more onboard sensors using a calibration table;

estimate an error associated with the calibration table based at least in part on the second set of measurements and the third set of measurements;

determine that the estimated error associated with the calibration table satisfies a threshold value;

update the calibration table to include information related to a six degrees of freedom (6DOF) position for the one or more onboard sensors based at least in part on a comparison of one or more of the first set of measurements and one or more of the second set of measurements that are determined to be most time-aligned based at least in part on the corresponding timestamps; and convert sensor-derived location information from a source reference frame to a reference frame associated with the vehicle using the updated calibration table.

20. The non-transitory computer-readable medium of claim 19, wherein the one or more instructions, when executed by the one or more processors, further cause the one or more processors to:

request the calibration data from the external source over a cellular vehicle-to-everything (C2VX) interface based at least in part on a confidence level associated with the one or more onboard sensors associated with the vehicle failing to satisfy a threshold value.

21. The non-transitory computer-readable medium of claim 19, wherein the one or more instructions, when executed by the one or more processors to estimate the error associated with the calibration table, further cause the one or more processors to:

project, within the field of view of the one or more onboard sensors, an expected set of pixels corresponding to an expected position of the one or more objects based at least in part on the calibration data and existing information in the calibration table; and estimate an error in the 6DOF position for the one or more onboard sensors based at least in part on a difference between the expected set of pixels and an actual set of pixels corresponding to an actual position of the one or more objects within the field of view of the one or more onboard sensors, wherein the calibration table is updated based at least in part on the estimated error in the 6DOF position.

22. The non-transitory computer-readable medium of claim 19, wherein the one or more objects correspond to one or more visually observable elements in an environment around the vehicle.

23. The non-transitory computer-readable medium of claim 19, wherein the one or more instructions, when executed by the one or more processors, further cause the one or more processors to:

receive, from a roadside unit, a wireless service advertisement indicating availability of a distributed sensor sharing service; and obtain the sensor-derived location information from an infrastructure sensor associated with the distributed sensor sharing service based at least in part on the wireless service advertisement.

24. The non-transitory computer-readable medium of claim 23, wherein the one or more instructions, when executed by the one or more processors, further cause the one or more processors to:
  request access to the distributed sensor sharing service based at least in part on detecting one or more of radar interference, a radio frequency shadow, or an optical shadow causing degraded performance for the one or more onboard sensors.

25. An apparatus, comprising:
  means for obtaining, from an external source, calibration data that includes a first set of measurements and corresponding timestamps related to a position of one or more objects in a reference frame associated with the external source, the calibration data being obtained from the external source based at least in part on a speed at which the external source is traveling, a direction of travel of the apparatus, and a direction of travel of the external source, wherein the speed at which the external source is traveling is greater than zero;
  means for identifying a second set of measurements and corresponding timestamps related to the position of the one or more objects within a field of view of one or more onboard sensors associated with a vehicle as the vehicle moves from a first location to a second location;
  means for determining a third set of measurements related to the position of the one or more objects within the field of view of the one or more onboard sensors using a calibration table;
  means for estimating an error associated with the calibration table based at least in part on the second set of measurements and the third set of measurements;
  means for determining that the estimated error associated with the calibration table satisfies a threshold value;
  means for updating the calibration table to include information related to a six degrees of freedom (6DOF) position for the one or more onboard sensors based at least in part on a comparison of one or more of the first set of measurements and one or more of the second set of measurements that are determined to be most time-aligned based at least in part on the corresponding timestamps; and
  means for converting sensor-derived location information from a source reference frame to a reference frame associated with the vehicle using the updated calibration table.

26. The apparatus of claim 25, further comprising:
  means for requesting the calibration data from the external source over a cellular vehicle-to-everything (C2VX) interface based at least in part on a confidence level associated with the one or more onboard sensors associated with the vehicle failing to satisfy a threshold value.

27. The apparatus of claim 25, wherein the means for estimating the error associated with the calibration table comprises:
  means for projecting, within the field of view of the one or more onboard sensors, an expected set of pixels associated with an expected position of the one or more objects based at least in part on the calibration data and existing information in the calibration table; and
  means for estimating an error in the 6DOF position for the one or more onboard sensors based at least in part on a difference between the expected set of pixels and an actual set of pixels corresponding to an actual position of the one or more objects within the field of view of the one or more onboard sensors, wherein the calibration table is updated based at least in part on the estimated error in the 6DOF position.

28. The apparatus of claim 25, wherein the one or more objects correspond to one or more visually observable elements in an environment around the vehicle.

29. The apparatus of claim 25, further comprising:
  means for receiving, from a roadside unit, a wireless service advertisement indicating availability of a distributed sensor sharing service; and
  means for obtaining the sensor-derived location information from an infrastructure sensor associated with the distributed sensor sharing service based at least in part on the wireless service advertisement.

30. The apparatus of claim 29, further comprising:
  means for requesting access to the distributed sensor sharing service based at least in part on detecting one or more of radar interference, a radio frequency shadow, or an optical shadow causing degraded performance for the one or more onboard sensors.

* * * * *